(12) United States Patent
Marshall et al.

(10) Patent No.: US 6,406,148 B1
(45) Date of Patent: Jun. 18, 2002

(54) ELECTRONIC COLOR SWITCHING IN FIELD SEQUENTIAL VIDEO DISPLAYS

(75) Inventors: Stephen W. Marshall, Richardson; James A. DeLong, Shady Shores, both of TX (US); Andrea C. Harriman, Yardley, PA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/475,731

(22) Filed: Dec. 30, 1999

Related U.S. Application Data

(60) Provisional application No. 60/114,558, filed on Dec. 31, 1998.

(51) Int. Cl.[7] ............................................. G03D 21/28
(52) U.S. Cl. ........................ 353/31; 348/742; 348/771; 353/99
(58) Field of Search .............................. 353/31, 33, 34, 353/37, 88, 89; 345/109; 348/740, 742, 743, 771

(56) References Cited

U.S. PATENT DOCUMENTS

| 4,786,146 A | * | 11/1988 | Ledebuhr ..................... 353/20 |
| 5,172,221 A | * | 12/1992 | Ko |
| 5,357,288 A | * | 10/1994 | Hiroshima et al. ......... 348/742 |
| 5,895,109 A | * | 4/1999 | Yamaguchi et al. .......... 353/31 |

* cited by examiner

Primary Examiner—William C. Dowling
(74) Attorney, Agent, or Firm—Charles A. Brill; Wade James Brady III; Frederick J. Telecky, Jr.

(57) ABSTRACT

A sequential color display system using three spatial light modulators and dichroic filters to sequentially provide a primary color light beam to a projection spatial light modulator. A set of dichroic filters separates a white light beam into primary colored light beams. Each primary colored light beam is modulated by a spatial light modulator to selectively allow it to travel to a second set of dichroic filters. The second set of dichroic filters recombines the primary color light beams—only one of which is typically active at any given time—to form a sequential color light beam. A projection spatial light modulator selectively modulates the sequential color light beam to form a sequential color image projected onto an image plane.

20 Claims, 2 Drawing Sheets

ELECTRONIC COLOR SWITCHING IN FIELD SEQUENTIAL VIDEO DISPLAYS

CROSS-REFERENCE TO RELATED APPLICATIONS

This application claims priority under 35 USC § 119(e)(1) of provisional application No. 60/114,558 filed Dec. 31, 1998.

The following patents and/or commonly assigned patent applications are hereby incorporated herein by reference:

| Patent No. | Filing Date | Issue Date | Title |
|---|---|---|---|
| 5,061,049 | Sept. 13, 1990 | Oct. 29, 1991 | Spatial Light Modulator and Method |
| 5,583,688 | Dec. 21, 1993 | Dec. 10, 1996 | Multi-Level Digital Micromirror Device |

FIELD OF THE INVENTION

This invention relates to the field of display systems, more particularly to color field sequential display systems.

BACKGROUND OF THE INVENTION

Micromechanical devices are small structures typically fabricated on a semiconductor wafer using techniques such as optical lithography, doping, metal sputtering, oxide deposition, and plasma etching which have been developed for the fabrication of integrated circuits.

Digital micromirror devices (DMDs), sometimes referred to as deformable micromirror devices, are a type of micromechanical device. Other types of micromechanical devices include accelerometers, pressure and flow sensors, gears and motors. While some micromechanical devices, such as pressure sensors, flow sensors, and DMDs have found commercial success, other types have not yet been commercially viable.

Digital micromirror devices are primarily used in optical display systems. In display systems, the DMD is a light modulator that uses digital image data to modulate a beam of light by selectively reflecting portions of the beam of light to a display screen. While analog modes of operation are possible—that is modes in which the mirror deflection is a function of the input data or bias voltage—DMDs typically operate in a digital bistable mode of operation in which the mirror is fully deflected at all times regardless of the image data applied to the mirror.

DMD-based display systems operating in the bistable mode require pulse-width modulation to create intermediate tones. Typical pulse width modulation schemes divide a frame period into binary bit periods. Each image data bit in the input data word controls the operation of the mirror during one bit period. Thus, if the bit is active, the mirror is turned on during the bit period and light from a light source is directed to the image plane during the bit period, If the image data bit is not active, the mirror is turned off during the bit period and light form the light source is directed away from the image plane during the bit period. The human eye, or other photoreceptor, integrates the energy directed to each pixel to create the perception of intermediate intensity levels.

Typical binary pulse width modulation system divide the larger bit periods into two or more bit-splits which are distributed throughout the frame period. Spreading the contribution of the large data bits throughout the frame period eliminates some of the artifacts created by the binary pulse width modulator schemes.

Full color images are created in one of two ways. One method uses three DMDs in parallel to produce three primary color images. The three primary color images are superimposed to form a single full-color image. The primary drawback of this method is cost. Not only do the three DMDs raise the cost of the system, they require the use of large, expensive, precision color prisms to accurately separate and recombine the light to and from the three DMDs. The large prism assembly requires the use of a large projection lens. Three-chip systems also require expensive alignment procedures to converge the images from the three separate modulators.

A second method uses one DMD and a spinning color filter wheel or drum. As each of the three primary color filters held by the wheel passes through a beam of light, the beam of light is temporally segmented into three sequential primary color light beams. Each temporal segment of the light beam is used to sequentially form three single-color images. If the three images are formed in rapid succession, the human eye perceives a single full-color image. Using three sequential primary color images to form a full color image is called field sequential display.

This field sequential method also has many drawbacks. While a single DMD is less expensive than the three used by the other method, a single DMD system requires a color wheel and motor, as well as additional data memory to store the two colors that are not being displayed. The color wheel can be noisy, especially when driven very fast. Color wheels also take time to synchronize to the incoming video signal, which can be annoying when "channel-surfing."

Single-chip systems are inherently less bright than a three-chip system using the same light source since at any given time only one-third of the available light is being used. The image brightness is also reduced because the modulators must be turned off when the color wheel is transitioning between two filters, commonly called the spoke time. Single DMD systems also create color separation artifacts when displaying motion since the image moves between the color fields. The use of a color wheel also limits the effective pixel depth to about 8 bits, since the frame period is divided into three color periods and the minimum cycle time for a DMD is about 20 $\mu$S. To match the picture quality of the traditional cathode ray tube (CRT) a DMD-based system must be capable of displaying the equivalent of 10 bits per color at a frame rate of 72 Hz.

What is needed is a method and system for obtaining the benefits of a field sequential system while overcoming or mitigating the traditional drawbacks of systems that use a color wheel to divide the white light beam into three sequential primary color beams.

SUMMARY OF THE INVENTION

Objects and advantages will be obvious, and will in part appear hereinafter and will be accomplished by the present invention which provides a method and system for electronically switching colors in a field sequential display system. According to one embodiment of the disclosed system, a sequential color display system is provided. The display system comprises: a white light source for emitting a beam of light along a first light path, a first set of dichroic filters on the first light path operable to separate the beam of light into three primary color light beams traveling along three primary color light paths, three spatial light modulators, each on one of the three primary color light paths and operable to selectively transmit portions of said primary color light beams, a second set of dichroic filters positioned to combine the selectively reflected portions of the primary color light beam into a recombined light beam, and a projection spatial light modulator positioned to receive the recombined light beam and to selectively transmit portions of the recombined light beam to an image plane in response to image data signals received from a controller. The set of three spatial light modulators sequentially provide a primary color to the projection spatial light modulator.

The present invention provides the technical advantage of producing a sequential color image without the use of a color wheel. The display system allows near-instantaneous synchronization with a received image signal since there is no color wheel to spin up or down, and can alter the color sequences or duration as needed to optimally display a received signal. The spatial light modulators used to switch the colors can have defects without having the defects noticeably affect the projected image. Using a spatial light modulator to create the primary color sequence allows the intensity of the light to be adjusted to improve bit depth. For example, a given modulator may turn off a portion of its elements to reduce the illumination intensity during a given period. The illumination modulators can also be adjusted to change the color temperature of the projected image.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

A new display system and method has been developed to allow a display system to achieve many of the benefits of a single modulator field sequential display system while minimizing the disadvantages previously experienced by single modulator field sequential display systems. The new display system and method uses a set of dichroic filters to separate a white light beam into primary color light beams. A spatial light modulator in the path of each primary color light beam acts as a shutter to rapidly turn the beam on and off. The spatial light modulator shutters can also add dynamic range to the image by partially attenuating the single color light beams.

Figure 1:
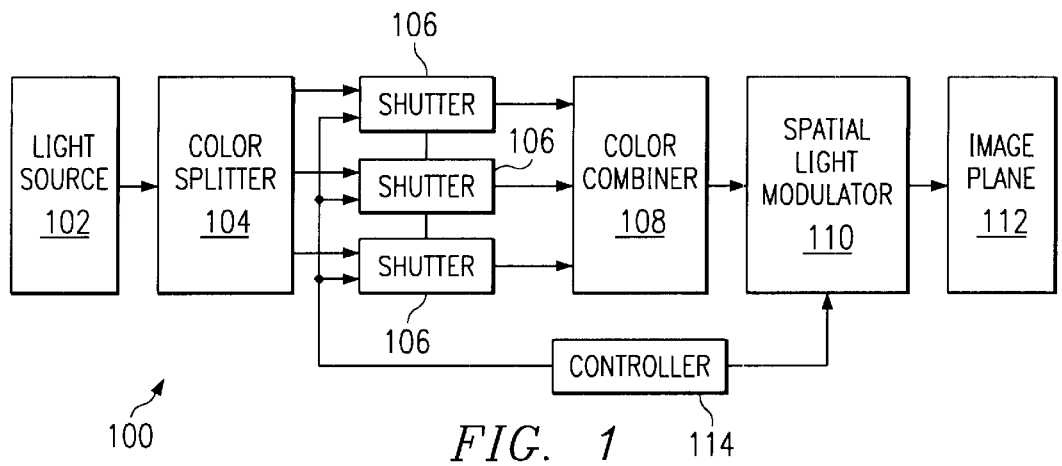
FIG. 1 is a block diagram of a projection system according to one embodiment of the disclosed invention.

FIG. 1 is a block diagram of a projection system 100 according to one embodiment of the disclosed invention. In FIG. 1, a light source 102, which may be one or more light sources acting in concert, outputs a beam of white light to a color splitter 104. The color splitter 104 separates the white light beam into component color beams. In FIG. 1, the white light beam is split into three primary color beams. Other systems utilizing the inventive concepts disclosed herein may separate the white light beam into two or more separate beams.

Each of the three primary color beams is input to an optical shutter 106. Each shutter 106 is electronically controlled and is able to quickly transition from a pass mode in which the primary color beam is allowed to continue to the color combiner 108, or a stop mode in which the primary color beam is not allowed to continue.

Light from the three optical shutters 106 is recombined by the color combiner 108 and passes to the imaging spatial light modulator 110. The imaging spatial light modulator selectively transmits portions of the recombined light beam to an image plane 112 in response to image data signals received from a controller 114. The controller synchronizes the operation of the imaging SLM and the optical shutters 106.

In a basic mode of operation, which closely emulates the operation of a color wheel based display system, one—and only one—of the optical shutters 106 is in the pass mode at any given time. The controller 114 synchronizes the operation of the shutters 106 with the data provided to the imaging SLM to create sequential single-color images on the image plane 112.

While any optical shutter 106 may provide some of the benefits described herein, the shutters 106 used in FIG. 1 ideally are optically efficient and have a fast switching time. Fast switching optical shutters eliminate the need for delays between the sequential color periods. As described below, the use of very fast optical shutters, with switching speeds approaching the speed of the imaging SLM, enables several innovative image improvement processes. In addition to being fast and efficient, it is advantageous for the optical shutters to be pixelated such that portions of the incident light are allowed to pass while other portions are not. While spatial light modulators such as liquid crystal devices (LCDs) are acceptable for low performance display systems, the speed, resolution, and optical efficiency provided by a DMD makes the DMD the ideal optical shutter for this application and enables the implementation of all of the features discussed herein.

The system shown in FIG. 1 provides the advantage that the optical shutters can be switched at any time. Therefore, unlike a color wheel whose inertial prevents rapid changes in the phase of the color wheel, the display system of FIG.

1 can synchronize to any video signal almost instantly. The system of FIG. 1 also eliminates the blanking periods that were necessary when the light beam passing through the color wheel transitioned from one filter segment to the next. The optical shutters of FIG. 1 are also silent, unlike a color wheel.

In addition to the advantages described above, the display system of FIG. 1 allows the controller much more freedom to optimize the projected display. The color space of a color wheel based system is fixed by the characteristics of the color wheel. Within the color space defined by the color wheel, a display controller can decrease the amount of a particular color in order to alter the white point of the display.

The display of FIG. 1, however, is not limited to pre-set color periods for each of the primary colors. Therefore, the display system of FIG. 1 may increase the period for a given primary color to compensate for a degrading light source or to boost a particular image color. The changes to the primary color periods may also be in response to a viewer input such as a hue control.

In addition to changing the periods allotted to each primary color, the display system of FIG. 1 can also adjust the purity of each primary color—something a color wheel system cannot do. By partially enabling a second optical shutter during the period in which a first optical shutter is enabled, the color contributed to an image by the data being provided to the imaging SLM is altered. Simultaneously enabling two or more optical shutters is used to both change the color gamut available to the display system and to boost the brightness of unsaturated images by adding a small white component to each primary color period.

As will be discussed in much greater detail with respect to FIGS. 4–8, a variable optical shutter, for example a pixelated optical shutter that is capable of partially attenuating the light transmitted to the color combiner 108 is useful for increasing the dynamic range of the imaging SLM. The dynamic range of the imaging SLM is increased by decreasing the light reaching the imaging SLM during one or more of the LSB periods. By decreasing the light, the imaging SLM is able to effectively create a bit-weight equivalent to a bit period shorter than the minimum cycle time of the imaging SLM.

As mentioned above, a very fast optical shutter is useful for greatly reducing color separation artifacts. Color separation artifacts occur when scenes contain motion or when a video sequence cuts to a new scene. Because the image is built up over three primary color periods, white objects can appear tinted before the eye integrates all three primary color periods. Likewise, when the eye tracks a moving white object across the image plane, the leading and trailing edges appear to be a primary color instead of white.

Color wheel based display systems attempt to eliminate the color separation artifacts by spinning the wheel at a multiple of the frame period. Typically the color wheel is spun at twice the frame period. Spinning a three segment color wheel at twice the frame rate creates six primary color segments each frame. Because each primary color is now used twice each frame, there is less temporal separation between the colors and the color separation artifact is reduced. There now are, however, six spoke periods during each frame instead of only three when the three segment color wheel was spun at the frame rate. This increase in spoke periods is not completely offset by a reduction in the spoke period. Therefore the additional spoke periods reduce the potential brightness of the display system.

A very fast optical shutter, for example a DMD having a response time equal to that of the imaging SLM, allows the active primary color to be changed each bit period, or sub-period if the bit periods are subdivided. Changing primary colors every bit period reduces the color separation artifact below a viewer's perceptive threshold.

Figure 2:
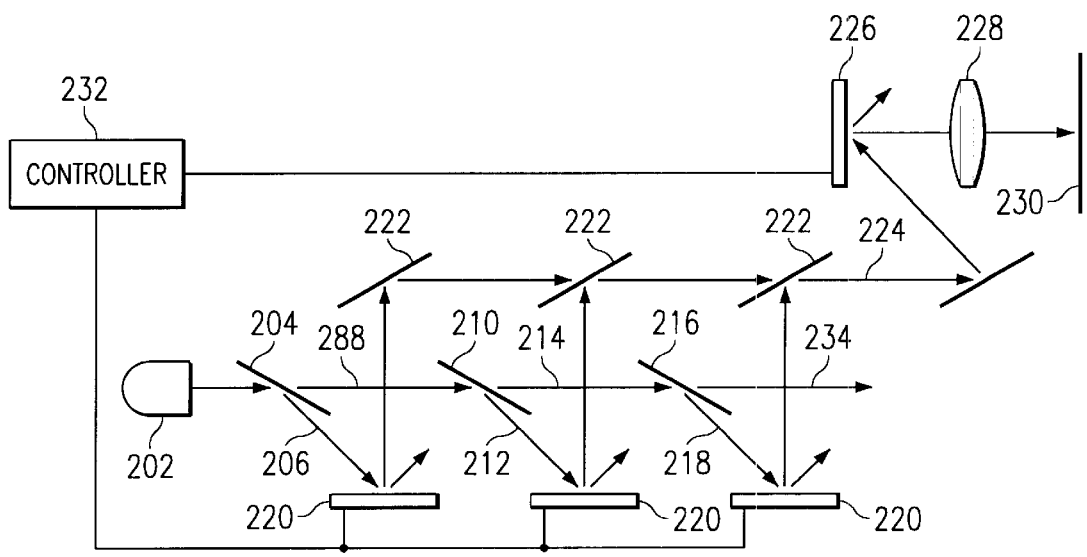
FIG. 2 is a schematic view of a projection system according to another embodiment of the disclosed invention utilizing three reflective spatial light modulators as optical shutters.

FIG. 2 is a schematic view showing one implementation of the display system of FIG. 1. In FIG. 2, the white light beam from the light source 202 strikes a first color splitter element 204. The first color splitter element 204 separates a first primary component 206, in this case a blue component, from the remaining light beam 208. The remaining light beam 208 strikes a second color splitter element which separates a second primary component 212, in this case a green component, from the remaining light beam 214. The remaining light beam 214 strikes the third color splitter element 216 which separates the third primary component, in this case a red component, from the remainder of the light beam 234. The remainder of the light beam 234 is comprised of infrared and ultraviolet light and is not used. If ultraviolet and infrared light are not a concern, the third color splitter element 216 could be a simple mirror.

Each primary component 206, 212, 218, travels to an optical shutter, in this case a DMD 220. The optical shutters 220 selectively transmit the incident primary components to color combiner elements 222 where the primary components are recombined along light path 224. When a shutter is off, the primary component beam is not allowed to pass to the color combiner.

Although the color splitter and color combiner functions have been shown as a series of dichroic mirrors, other forms of color splitters and combiners, such as dichroic crosses and prisms are used in other embodiments.

The recombined primary light components are incident upon the imaging SLM, shown as DMD 226. The imaging SLM selectively transmits the recombined light to a projection lens 228 in response to image signals from controller 232. The projection lens 228 focuses the light on image plane 230 to form an image.

Figure 3:
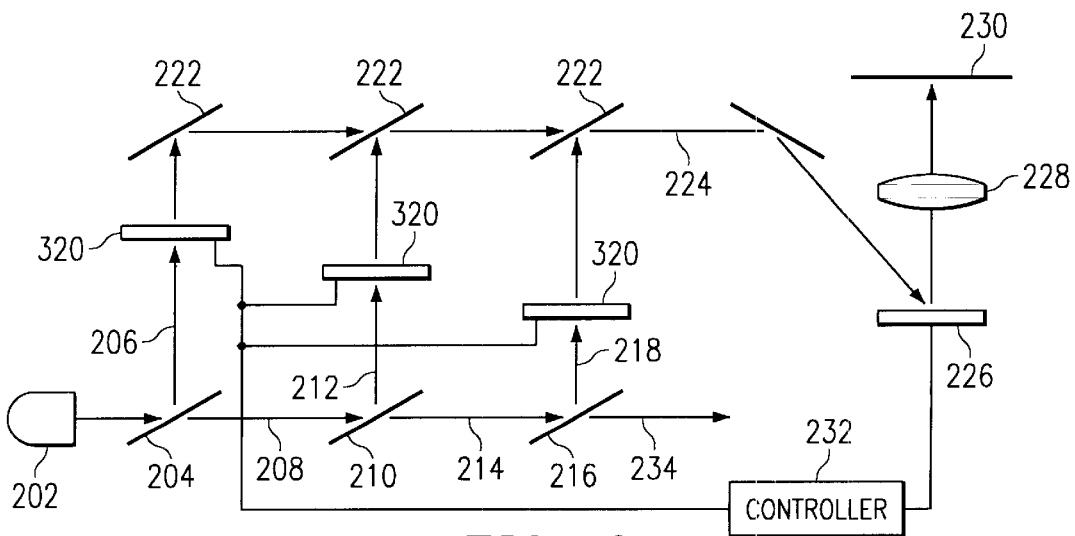
FIG. 3 is a schematic view of a projection system according to another embodiment of the disclosed invention utilizing three transmissive spatial light modulators as optical shutters.

FIG. 3 is a schematic view of another implementation of the display system of FIG. 1. The display system of FIG. 3 is similar to the display system of FIG. 2, except that transmissive optical shutters 320 have been used. The display systems of both FIGS. 2 and 3 have equal length optical path for each of the three primary colors. Additionally, for reasons that will be explained below, the optical shutters preferably are not located near an image plane of the optical path.

As discussed above, it is advantageous to use optical shutters that are capable of partially attenuating the primary color light beams. If a pixelated optical shutter, for example a DMD, is used, the partial attenuation is achieved by turning some of the modulator element off. Relatively fine control of the amount of attenuation is needed to adjust the color gamut of the display system. Very coarse control is all that is necessary, however, to extend the dynamic range of the display.

The dynamic range of a binary pulse width modulated display system is limited by the minimum cycle time of the modulator. The minimum cycle time of the modulator, that is the time it take an element to turn on and off, determines the number of bit periods in a given frame period. To extend the dynamic range of the display system one bit, when the LSB period is equal to the minimum cycle time of the modulator, the intensity of the light reaching the imaging SLM is cut in half and the imaging SLM is operated for one LSB period. To extend the dynamic range another bit the intensity of the light reaching the imaging SLM is cut in half again and the imaging SLM operated for another LSB period.

Ideally, the intensity of light reaching the imaging SLM is reduced in a manner that cannot be detected in the final image. Pixelated optical shutters are located away from any image plane of the optical path to minimize the impact to the image of the pixels that are turned off to attenuate the primary color light. A beneficial side effect of locating the optical shutters away from all image planes is that imperfect devices may be used for the optical shutters. In the case of a DMD, DMDs with several non-functioning micromirror elements, scratches, or other optical imperfections can be used as optical shutters. Ideally, any flaws in the optical shutters are evenly distributed over the entire array so that their effects won't be localize in the image produce by the display system.

Figure 4:
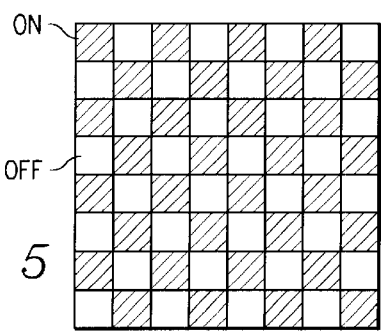
FIG. 4 is a plan view of a pixelated spatial light modulator optical shutter showing the pixels of the modulator divided into five groups.

Just as any defects are ideally spread over the surface of the micromirror device, so to the cells used to attenuate the primary color should be evenly distributed over the surface of the array. Rather than writing data to each and every cell of the optical shutter, the cells are grouped into a small number of groups that are all operated together in the same manner. FIG. 4 is a plan view of a pixelated spatial light modulator optical shutter showing the pixels of the modulator divided into five groups. The five groups shown in FIG. 4 provide four additional illumination levels—increasing the dynamic range of a display by up to four bits.

Figure 5:
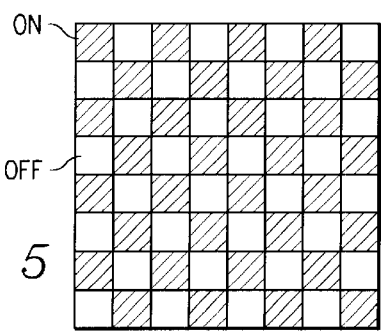
FIG. 5 is a plan view of the pixelated spatial light modulator optical shutter of FIG. 4 showing the pixel groups one, two, three, and four turned on, and group five turned off for a 50% duty cycle.
Figure 6:
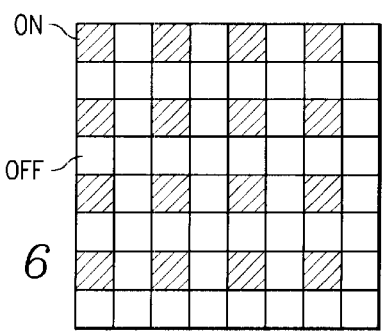
FIG. 6 is a plan view of the pixelated spatial light modulator optical shutter of FIG. 4 showing the pixel groups one, two, and three turned on, and groups four and five turned off for a 25% duty cycle.
Figure 7:
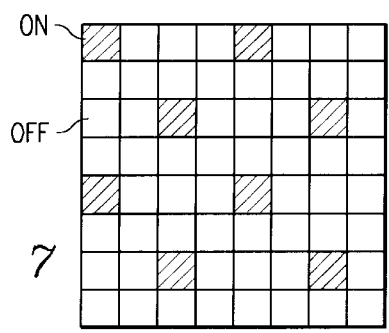
FIG. 7 is a plan view of the pixelated spatial light modulator optical shutter of FIG. 4 showing the pixel groups one and two turned on, and groups three, four, and five turned off for a 12.5% duty cycle.
Figure 8:
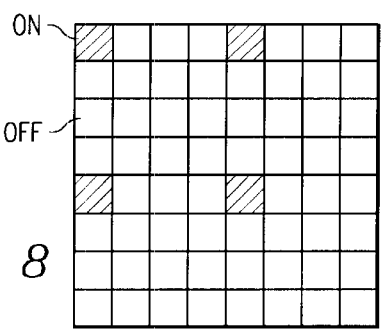
FIG. 8 is a plan view of the pixelated spatial light modulator optical shutter of FIG. 4 showing the pixel group one turned on, and groups two, three, four, and five turned off for a 6.25% duty cycle.

To cut the intensity of the primary color light beam in half, all group 5 modulator elements are turned off. FIG. 5 is a plan view of the optical shutter of FIG. 4 with all of the group 5 elements turned off. In FIGS. 5–8 the shaded elements are turned on. To cut the intensity in half again, all group 4 modulator elements are turned off. FIG. 6 is a plan view of the optical shutter of FIGS. 4 and 5 with all of the group 4 and 5 elements turned off. This process continues as shown in FIGS. 7 and 8 until only 6.25% of the elements, four out of sixty-four, remain on.

The brightness loss due to this increase in dynamic range depends on the number of bits added to the dynamic range. Table 1 shows the bit periods and intensity levels for an 8-bit system that has achieved a 2-bit increase in dynamic range using the attenuation technique described above. As shown in Table 1, the decrease in maximum brightness is 5 out of 260 units, or 1.92%. The minimum cycle time needed to implement the scheme of Table 1, determined by dividing the minimum number of time units by the quantity of frame rate times the number of primary colors times the total number of time units, is 71.2 $\mu$S for a 72 Hz frame rate and 85.6 $\mu$S for a 59.94 Hz frame rate.

TABLE 1

8-Bit Example #1

| BIT # | TIME UNITS | INTENSITY | WEIGHT | LOST LIGHT |
| --- | --- | --- | --- | --- |
| 7 | 128 | 100% | 128 | 0 |
| 6 | 64 | 100% | 64 | 0 |
| 5 | 32 | 100% | 32 | 0 |
| 4 | 16 | 100% | 16 | 0 |
| 3 | 8 | 100% | 8 | 0 |
| 2 | 4 | 100% | 4 | 0 |

TABLE 1-continued

8-Bit Example #1

| BIT # | TIME UNITS | INTENSITY | WEIGHT | LOST LIGHT |
| --- | --- | --- | --- | --- |
| 1 | 4 | 50% | 2 | 2 |
| 0 | 4 | 25% | 1 | 3 |
| TOTAL | 260 | | | 5 |

Table 2 shows the bit periods and intensity levels for an 8-bit system that has achieved a 1-bit increase in dynamic range using the attenuation technique described above. As shown in Table 2, the decrease in maximum brightness is 1 out of 256 units, or 0.39%. The minimum cycle time needed to implement the scheme of Table 2 is 36.2 $\mu$S for a 72 Hz frame rate and 43.4 $\mu$S for a 59.94 Hz frame rate.

TABLE 2

8-Bit Example #2

| BIT # | TIME UNITS | INTENSITY | WEIGHT | LOST LIGHT |
| --- | --- | --- | --- | --- |
| 7 | 128 | 100% | 128 | 0 |
| 6 | 64 | 100% | 64 | 0 |
| 5 | 32 | 100% | 32 | 0 |
| 4 | 16 | 100% | 16 | 0 |
| 3 | 8 | 100% | 8 | 0 |
| 2 | 4 | 100% | 4 | 0 |
| 1 | 2 | 100% | 2 | 0 |
| 0 | 2 | 50% | 1 | 1 |
| TOTAL | 256 | | | 1 |

Table 3 shows the bit periods and intensity levels for a 10-bit system that has achieved a 4-bit increase in dynamic range using the attenuation technique described above. As shown in Table 3, the decrease in maximum brightness is 49 out of 1072 units, or 4.57%. The minimum cycle time needed to implement the scheme of Table 3 is 69.1 $\mu$S for a 72 Hz frame rate and 83.0 $\mu$S for a 59.94 Hz frame rate.

TABLE 3

10-Bit Example #1

| BIT # | TIME UNITS | INTENSITY | WEIGHT | LOST LIGHT |
| --- | --- | --- | --- | --- |
| 9 | 512 | 100% | 512 | 0 |
| 8 | 256 | 100% | 256 | 0 |
| 7 | 128 | 100% | 128 | 0 |
| 6 | 64 | 100% | 64 | 0 |
| 5 | 32 | 100% | 32 | 0 |
| 4 | 16 | 100% | 16 | 0 |
| 3 | 16 | 50% | 8 | 8 |
| 2 | 16 | 25% | 4 | 12 |
| 1 | 16 | 12.5% | 2 | 14 |
| 0 | 16 | 6.25% | 1 | 15 |
| TOTAL | 1072 | | | 49 |

Table 4 shows the bit periods and intensity levels for a 10-bit system that has achieved a 3-bit increase in dynamic range using the attenuation technique described above. As shown in Table 4, the decrease in maximum brightness is 17 out of 1040 units, or 1.635%. The minimum cycle time needed to implement the scheme of Table 4 is 35.6 $\mu$S for a 72 Hz frame rate and 42.8 $\mu$S for a 59.94 Hz frame rate.

TABLE 4

10-Bit Example #2

| BIT # | TIME UNITS | INTENSITY | WEIGHT | LOST LIGHT |
|---|---|---|---|---|
| 9 | 512 | 100% | 512 | 0 |
| 8 | 256 | 100% | 256 | 0 |
| 7 | 128 | 100% | 128 | 0 |
| 6 | 64 | 100% | 64 | 0 |
| 5 | 32 | 100% | 32 | 0 |
| 4 | 16 | 100% | 16 | 0 |
| 3 | 8 | 100% | 8 | 0 |
| 2 | 8 | 50% | 4 | 4 |
| 1 | 8 | 25% | 2 | 6 |
| 0 | 8 | 12.5% | 1 | 7 |
| TOTAL | 1040 | | | 17 |

Figure 9:
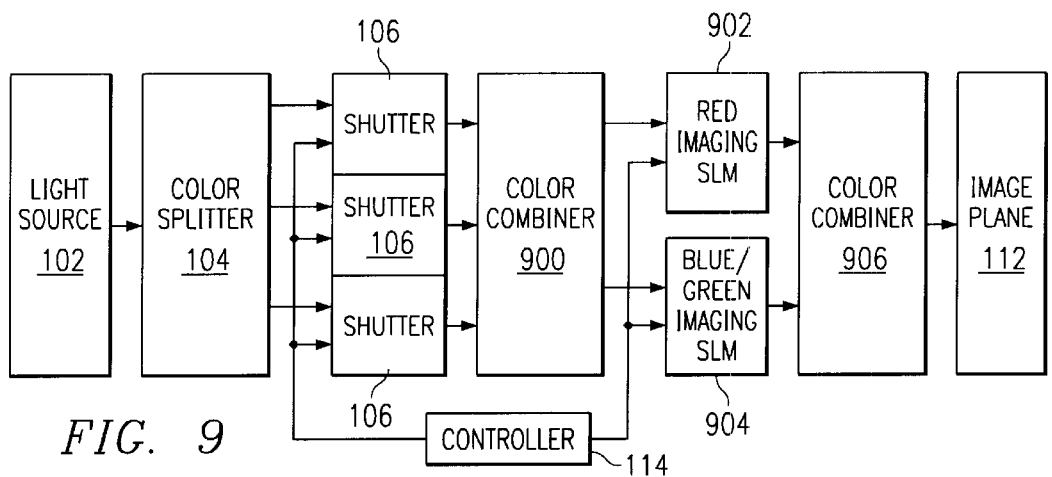
FIG. 9 is a block diagram of a projection system according to one embodiment of the disclosed invention showing the application of the invention to a display system having two imaging spatial light modulators.

The disclosed invention is also applicable to systems using two imaging SLMs as shown in the block diagram of FIG. 9. These systems, commonly call two-chip systems since they have two imaging SLMs, attempt to strike a balance between the advantages and disadvantage of two and three-chip systems. In particular, two-chip systems boost the brightness of the display without the expense and complexity of a three-chip display system. Because most light sources do not produce intense red light, two-chip systems typically use one imaging SLM 902 to modulate red light the entire frame period, while the second imaging SLM 904 alternates between the other two primaries.

The display system of FIG. 9 is similar to the system of FIG. 1 through the optical shutters 106. After the optical shutters 106, the three primary colors are recombined by color combiner 900 into a red beam and a blue/green, or cyan, beam. The two light beams are modulated by the imaging SLMs 902, 904, before being combined by the color combiner 906 and focused on the image plane 112. The two color combiners 900, 906 are implemented in one of several ways.

A first implementation of the color combiners uses a series of dichroic mirrors to recombine all three primaries. The recombined light beam is then input to a color splitting prism, which separates the red beam from the cyan beam and directs the two beams to the two imaging SLMs. The light reflected by the two imaging SLMs is then recombined by the color splitting prism and directed toward the image plane. Thus, the color splitting prism performs the function of color combiner 906 and part of the function of color combiner 900. Various other methods of recombining the light from the optical shutters are available using dichroic filters, mirrors, and prisms.

The bit periods and intensity levels shown in Table 5 also apply to a 10-bit two-chip system with a 3-bit increase in dynamic range using the attenuation technique described above. For a two-chip system, the minimum cycle time needed to implement the scheme of Table 4 is 53.4 µS for a 72 Hz frame rate and 64.2 µS for a 59.94 Hz frame rate.

Thus, although there has been disclosed to this point a particular embodiment for electronically switching colors in a field sequential display system, it is not intended that such specific references be considered as limitations upon the scope of this invention except insofar as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims.

What is claimed is:

1. A sequential color display system comprising:
    a white light source for emitting a beam of light along a first light path;
    a first set of dichroic filters on said first light path, said first set of dichroic filters operable to separate said beam of light into three primary color light beams traveling along three primary color light paths;
    three spatial light modulators, each of said three spatial light modulators on one of said three primary color light paths, each of said three spatial light modulators operable to selectively transmit portions of said primary color light beams;
    a second set of dichroic filters positioned to combine said selectively reflected portions of said primary color light beam into a recombined light beam; and
    a projection spatial light modulator positioned to receive said recombined light beam and to selectively transmit portions of said recombined light beam to an image plane in response to image data signals received from a controller.

2. The sequential color display system of claim 1, said three spatial light modulators sequentially operated such that said recombined light beam is a primary color light beam whose color changes as said three spatial light modulators are sequenced.

3. The sequential color display system of claim 1, each of said three spatial light modulators transmitting said primary color beam to said second set of dichroic filters during a unique portion of a frame period.

4. The sequential color display system of claim 1, each of said three spatial light modulators comprised of a digital micromirror device.

5. The sequential color display system of claim 4, each of said digital micromirror devices operable to transmit said primary color light beam to said second set of dichroic filters by reflecting said primary color light beam on mirrors in an on position.

6. The sequential color display system of claim 5, at least one of said digital micromirror devices varying a proportion of mirrors in said on position to alter the intensity of light transmitted to said second set of dichroic filters.

7. The sequential color display system of claim 6, said proportion varied during said unique portion of said frame period to provide binary intensity levels to said projection spatial light modulator during portions of said unique portion of said frame period.

8. The sequential color display system of claim 6, said proportion selected to alter the color temperature of an image created by said sequential color display system.

9. The sequential color display system of claim 1, said projection spatial light modulator being a micromirror device.

10. The sequential color display system of claim 1, said projection spatial light modulator selectively transmitting portions of said recombined light beam by selectively reflecting said portions to said image plane.

11. The sequential color display system of claim 1, said projection spatial light modulator selectively transmitting portions of said recombined light beam by selectively reflecting said portions to a projection lens.

12. A sequential color display system comprising:
    a white light source for emitting a beam of light along a first light path;
    a first set of dichroic filters on said first light path, said first set of dichroic filters operable to separate said beam of light into three primary color light beams traveling along three primary color light paths;

three micromirror arrays, each of said three micromirror arrays on one of said three primary color light paths, each of said three micromirror arrays operable to selectively transmit portions of said primary color light beams;

a second set of dichroic filters positioned to combine said selectively reflected portions of said primary color light beam into a recombined light beam; and a projection spatial light modulator positioned to receive said recombined light beam and to selectively transmit portions of said recombined light beam to an image plane in response to image data signals received from a controller.

13. The sequential color display system of claim 12, said three micromirror arrays sequentially operated such that said recombined light beam is a primary color light beam whose color changes as said three micromirror arrays are sequenced.

14. The sequential color display system of claim 12, each of said three micromirror arrays transmitting said primary color beam to said second set of dichroic filters during a unique portion of a frame period.

15. The sequential color display system of claim 12, each of said digital micromirror devices operable to transmit said primary color light beam to said second set of dichroic filters by reflecting said primary color light beam on mirrors in an on position.

16. The sequential color display system of claim 15, at least one of said digital micromirror devices varying a proportion of mirrors in said on position to alter the intensity of light transmitted to said second set of dynamic filters.

17. The sequential color display system of claim 16, said proportion varied during said unique portion of said frame period to provide binary intensity levels to said projection spatial light modulator during portions of said unique portion of said frame period.

18. The sequential color display system of claim 17, said proportion selected to alter the color temperature of an image created by said sequential color display system.

19. The sequential color display system of claim 12, said projection spatial light modulator being a micromirror device.

20. The sequential color display system of claim 12, said projection spatial light modulator selectively transmitting portions of said recombined light beam by selectively reflecting said portions to a projection lens.

* * * * *